US008825996B2

(12) United States Patent
Padhye et al.

(10) Patent No.: US 8,825,996 B2
(45) Date of Patent: Sep. 2, 2014

(54) PLATFORM THAT FACILITATES PRESERVATION OF USER PRIVACY

(75) Inventors: Jitendra D. Padhye, Redmond, WA (US); Ratul Mahajan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 313 days.

(21) Appl. No.: 13/163,045

(22) Filed: Jun. 17, 2011

(65) Prior Publication Data

US 2012/0324228 A1 Dec. 20, 2012

(51) Int. Cl.
*H04L 9/32* (2006.01)
*H04W 4/20* (2009.01)
*H04L 9/08* (2006.01)
*H04W 12/02* (2009.01)
*H04W 8/16* (2009.01)
*H04L 29/06* (2006.01)

(52) U.S. Cl.
CPC ............... *H04W 4/20* (2013.01); *H04L 9/321* (2013.01); *H04L 2209/80* (2013.01); *H04L 9/0872* (2013.01); *H04L 9/3226* (2013.01); *H04W 8/16* (2013.01); *H04L 9/0869* (2013.01); *H04W 12/02* (2013.01); *H04L 63/0421* (2013.01)
USPC ................ 713/150; 713/162; 380/270; 726/7

(58) Field of Classification Search
USPC ................ 713/176, 150, 162; 726/7; 380/270
See application file for complete search history.

(56) References Cited

U.S. PATENT DOCUMENTS

| | | | | |
|---|---|---|---|---|
| 7,433,673 | B1 * | 10/2008 | Everson et al. ............. | 455/404.1 |
| 2002/0080968 | A1 * | 6/2002 | Olsson .......................... | 380/270 |
| 2006/0173612 | A1 * | 8/2006 | Steel .............................. | 701/207 |
| 2008/0044029 | A1 * | 2/2008 | Gilhuly et al. ................ | 380/278 |
| 2008/0070593 | A1 | 3/2008 | Altman et al. | |
| 2009/0310785 | A1 * | 12/2009 | Barrus et al. .................. | 380/259 |
| 2010/0024045 | A1 | 1/2010 | Sastry et al. | |

OTHER PUBLICATIONS

Freni, Dario, "Privacy Preservation in Location-Based Proximity Services", Retrieved at <<http://air.unimi.it/bitstream/2434/155484/4/phd_unimi_R07629.pdf>>, Mar. 25, 2011, pp. 1-149.

Mascetti, et al., "Longitude: Centralized Privacy-Preserving Computation of Users' Proximity", Retrieved at <<http://homes.dico.unimi.it/~mascetti/papers/09-SDM.pdf>>, Proceedings of the 6th VLDB Workshop on Secure Data Management, vol. 5776, Aug. 28, 2009, pp. 1-16.

Mascetti, et al.,"Privacy-Aware Proximity Based Services", Retrieved at <<http://ieeexplore.ieee.org/stamp/stamp.jsp?arnumber=05088918, May 18-20, 2009, pp. 31-40.

(Continued)

*Primary Examiner* — Jung Kim
*Assistant Examiner* — Ayoub Alata
(74) *Attorney, Agent, or Firm* — Steve Wight; Carole Boelitz; Micky Minhas

(57) ABSTRACT

Described herein are technologies pertaining to preserving privacy of users of mobile computing devices. Two users of two mobile computing devices share a quantization scheme for quantizing location data using a predefined quantization interval. The two users additionally share a private key that is utilized to encrypt locations obtained by the two computing devices that have been quantized using the shared quantization scheme. Encrypted, quantized locations are compared in a cloud computing service in connection with answering location-based queries, where the comparison is undertaken without the cloud computing service decrypting the encrypted, quantized locations.

20 Claims, 9 Drawing Sheets

(56) References Cited

OTHER PUBLICATIONS

Puttaswamy, et al., "Preserving Privacy in Location-based Mobile Social Applications", Retrieved at <<http://www.cs.ucsb.edu/~krishnap/papers/lbsa-hotmobile10.pdf>>, Proceedings of the Eleventh Workshop on Mobile Computing Systems & Applications, vol. 02, Issue 01, Feb. 22-23, 2010, pp. 1-6.

Narayanan, et al.,"Location Privacy via Private Proximity Testing", Retrieved at <<http://unikehamburg.com/papers/locpriv/locpriv.pdf >>, Retrieved Date: May 6, 2011, pp. 1-21.

Dong, et al., "Secure Friend Discovery in Mobile Social Networks", Retrieved at << http://www.cs.utexas.edu/~yzhang/papers/msn-info11.pdf >>, Retrieved Date: May 6, 2011, pp. 1-9.

* cited by examiner

PLATFORM THAT FACILITATES PRESERVATION OF USER PRIVACY

BACKGROUND

Popularity of mobile computing devices has increased dramatically over a relatively short period of time, and so has the popularity of location-based applications that can be executed on these devices. Mobile computing devices such as smart phones are different from conventional computing devices in that users generally carry their smart phones with them as they travel. Currently, smart phones are equipped with sophisticated operating systems that facilitate execution of a multitude of different types of applications, such as client-side e-mail applications, word processing applications, spreadsheet applications, and the like.

Additionally, many applications have been developed for execution on mobile computing devices that utilize location to provide a particular service. These applications will be referred to herein as "location-based" applications. An exemplary location-based application is social networking application that is configured to inform a user of a mobile computing device when a location-based constraint specified by the user has been satisfied. In a first exemplary location-based social networking application, a first user of a first mobile computing device may indicate that she wishes to be informed whenever a second user (an individual registered as a contact of the first user of the social networking application) is within a particular geographic range of a current location of the first user. Conventionally, this is accomplished by causing the mobile computing devices of the first and second users to upload latitude/longitude coordinates to a server in a cloud computing environment, where the server is configured to compare the latitude/longitude coordinates of the users to determine when the location constraint (the second user is within a predefined geographic distance of the first user) is satisfied. If it is determined that the two users are in geographic proximity to one another, a notification can be sent to at least the first mobile computing device of the first user that informs the first user that the second user is nearby.

Another exemplary location-based social networking application supports historic querying of location data. For example, the first user of the first computing device can issue a query to ascertain whether a friend of the first user has ever visited a specified geographic location and/or provided any information pertaining to the specified geographic location. In an example, the first user may be near a restaurant and may wonder if any of her friends have previously frequented the restaurant and provided a review of the restaurant. Accordingly, the location-based application executing on the first mobile computing device of the user can upload the location of the restaurant to the cloud computing service, which may then compare such location with geographic locations uploaded by friends of the user that are also registered with the location-based application. If it is determined that a friend of the first user (e.g., the second user) has uploaded data that indicates that the second user visited the restaurant (and provided a review of the restaurant), then the cloud computing service can transmit a notification to the first mobile computing device that informs the first user that the second user has previously been a patron at the restaurant and that the second user has reviewed the restaurant.

Currently, the design of these services is such that the cloud computing service has access to the actual locations of users.

SUMMARY

The following is a brief summary of subject matter that is described in greater detail herein. This summary is not intended to be limiting as to the scope of the claims.

Described herein are various technologies pertaining to responding to location-based queries without having knowledge of the actual geographic locations of users that pertain to the location-based query. Pursuant to an example, a first user and a second user may have a first mobile computing device and a second mobile computing device, respectively, that are executing a location-based application. The location-based application is configured to inform the first user when the second user is within a specified geographic range of the first user and/or inform the first user if the second user has ever been at one or more locations specified by the first user. In an example, the first mobile computing device can cause a location-based query to be transmitted to a server in a cloud computing system. The location-based query may include an encrypted identity of the second user of the second mobile computing device, as well as a location constraint, wherein the location constraint includes a first encrypted location. As the second user travels to different geographic locations, the second mobile computing device can upload encrypted locations to the cloud computing system. As will be described in greater detail herein, the first user and the second user can share an encryption algorithm and a private key that is utilized to encrypt the location constraint as well as locations uploaded by the mobile computing devices. The second mobile computing device can additionally upload an encrypted identity of the second user.

Thereafter, the server can be configured to compare the encrypted identity of the second user included in the location-based query with the encrypted identity of the second user provided by the second mobile computing device of the second user. Additionally, the server can be configured to compare the encrypted location constraint (which includes at least one encrypted geographic location) received from the first mobile computing device with encrypted locations uploaded to the server from the second mobile computing device of the second user. The server may then ascertain that the encrypted identities match and may further ascertain that the encrypted location constraint has been satisfied by one or more of the uploaded encrypted locations from the second computing device. The server can then transmit a response to the location-based query to the first computing device of the first user, which can indicate that the location constraint set forth by the first user has been satisfied. It is to be understood that the server can respond to the location-based query without having knowledge of the identity of the first user, the identity of the second user, the location constraint in the location-based query, or the actual location(s) of the second user of the second computing device. In other words, the server can respond to the location-based query without decrypting the encrypted identity of the second user, the encrypted location constraint, or the encrypted locations uploaded from the second mobile computing device of the second user.

Pursuant to an example, a combination of encryption and quantization can be utilized to facilitate responding to location-based queries without decrypting encrypted location constraints or uploaded encrypted locations. In an exemplary embodiment, the first mobile computing device and the second mobile computing device can share a secure random number generator, a private key, and a quantization interval. Each of the first mobile computing device and the second mobile computing device can cause the secure random number generator to generate a series of random numbers through utilization of the shared private key. Therefore, both the first mobile computing device and the second mobile computing device generate an identical set of random numbers. Thereafter, each of the first mobile computing device and the second mobile computing device can sort the random numbers in a sequence (e.g., from smallest to largest). The sequence of random numbers may then be mapped to a respective sequence of quantized geographic points. In a two-dimensional coordinate system (latitude and longitude), this quantization and mapping can be done with respect to both latitude and longitude coordinates. When a location is uploaded to the server in the cloud computing system (either a location constraint or a location uploaded from the second mobile computing device), such location is first quantized at the respective mobile computing device and then mapped to the random number according to the mapping between quantized locations and the sequence of random numbers. This random number is uploaded to the server; the server does not have access to the shared private key, and thus the server is unable to ascertain the actual geographic location that is uploaded to the server. Both mobile computing devices, however, have identical mappings between quantized locations and random numbers generated by the shared random number generator. Thus, the server can respond to certain location-based queries without having knowledge of the actual geographic location of either the first mobile computing device or the second mobile computing device.

In another exemplary embodiment, the first mobile computing device and the second mobile computing device can share an encryption algorithm and a private key. Additionally, the first mobile computing device and the second mobile computing device can share a quantization interval that is employed to quantize geographic locations. When either of the first mobile computing device or the second mobile computing device provides location data to the server (either a location constraint or data indicative of a current location), the computing devices first quantize the location, and thereafter encrypt the location utilizing the encryption algorithm and the shared private key. Therefore, if the first mobile computing device and the second mobile computing device are in the same location, the encrypted values uploaded to the server will also be the same, but the actual location of the mobile computing devices will not be ascertainable without knowledge of the private key and the encryption algorithm that has been used to encrypt the location data. Again, using this approach, the server can respond to location-based queries without having knowledge of the location constraint or the actual location of either of the first mobile computing device or the second mobile computing device Other aspects will be appreciated upon reading and understanding the attached figures and description.

DETAILED DESCRIPTION

Figure 1:
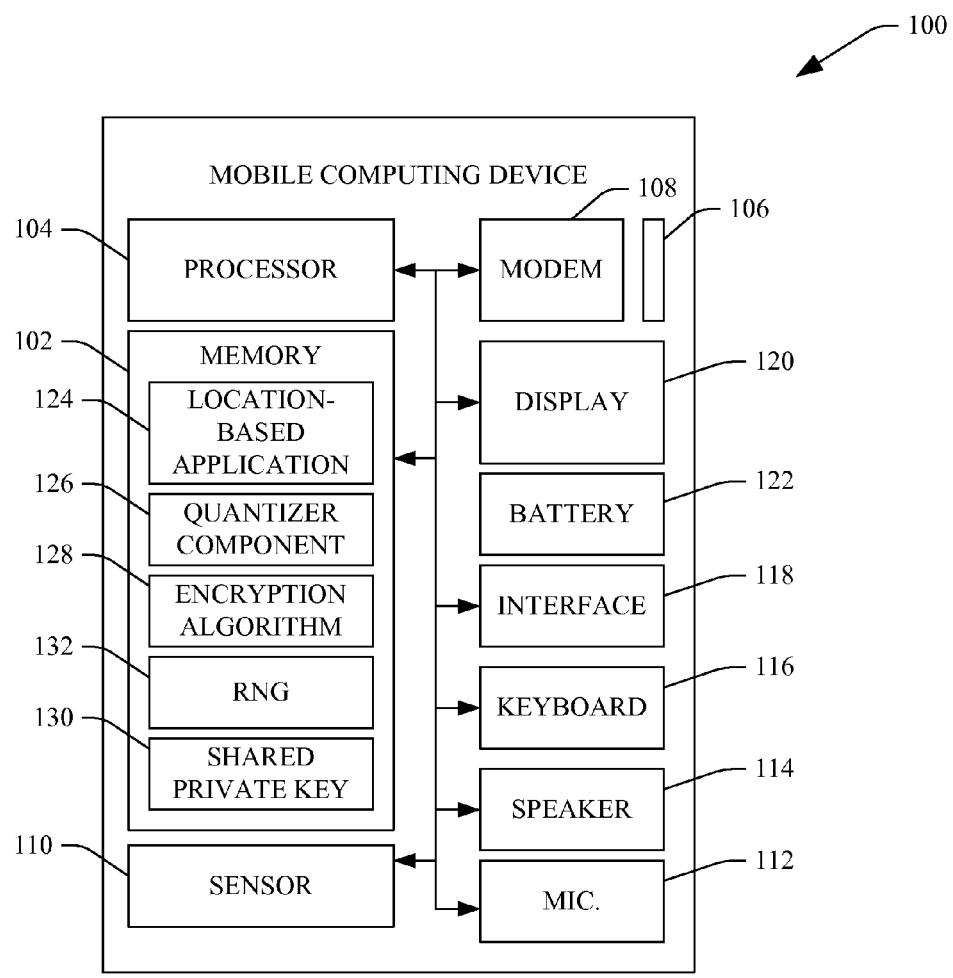
FIG. 1 is a functional block diagram of an exemplary mobile computing device.

Various technologies pertaining to responding to location-based queries will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference now to FIG. 1, an exemplary mobile computing device 100 is illustrated. As used herein, the term "mobile computing device" is intended to encompass a portable telephone such as a smartphone, a portable media player, a portable gaming console, a laptop computer, a tablet computing device or other suitable portable computing device. The mobile computing device 100 comprises a memory 102 that includes a plurality of instructions. The mobile computing device 100 additionally includes a processor 104 that executes the instructions that are retained in the memory 102. Exemplary instructions that are retained in the memory 102 that can be accessed by the processor 104 will be presented below.

The mobile computing device 100 further includes a wireless transceiver 106 that is configured to send and receive wireless data to and from another computing device, which may be another mobile computing device, a cell phone tower, a wireless router, or the like. A modem 108 operates in conjunction with the transceiver 106 to send and receive wireless signals to and from another computing device. Specifically, the modem 108 can modulate an analog carrier signal to encode digital information and can also demodulate a carrier signal to decode digital information resident in such carrier signal. The processor 104 can provide the modem 108 with digital data to encode, and the modem 108 can provide the processor 104 with decoded digital data. The processor 104 may then perform some action based at least in part upon the decoded digital data provided thereto by the modem 108.

The mobile computing device 100 may additionally include a sensor 110 that is configured to output or compute a current geographic location of the mobile computing device 100. Accordingly, as used herein, the sensor 110 is intended to encompass a hardware sensor such as a GPS receiver, as well as a software-based sensor such as an algorithm that can estimate or compute the geographic location of the mobile computing device 100 based at least in part upon, for instance, signal strengths of base stations that are in communication with the mobile computing device 100.

A microphone 112 can capture analog audio from a user, wherein the user wishes to cause the processor 104 to perform a particular function through a voice command, or wishes that spoken audio be transmitted to another mobile computing device by way of the modem 108 and the transceiver 106. A speaker 114 can audibly output information to the user of the mobile computing device 100. For instance, the mobile computing device 100 may be a mobile telephone, and the speaker 114 can be configured to audibly output spoken words received from another telephone at the mobile computing device 100. The mobile computing device 100 may additionally include a keyboard 116 that facilitates receipt of tactile input from a user of the mobile computing device 100. The keyboard 116 may include a plurality of alphanumeric keys.

The mobile computing device 100 may further comprise an interface 118 that allows the mobile computing device 100 to, for instance, mechanically interface with another computing device. For example, the interface 118 can facilitate coupling of the mobile computing device 100 to a docking station such that the contents of the mobile computing device 100 can be synchronized with another computing device. In another exemplary embodiment, the interface 118 may facilitate receipt of external storage to expand the storage space available on the mobile computing device 100. For instance, the interface 118 can receive a flash memory device, a secure digital memory card, or other suitable expansion memory. A display 120 may additionally be included in the mobile computing device 100, wherein the display 120 is configured to visibly output data to the user of the mobile computing device 100. The display 120, in an exemplary embodiment, may be interactive such that a user of the mobile computing device 100 can interact with such computing device 100 by touch or stylus via the display 120. A battery 122 is operative to provide power to the aforementioned modules as well as other modules that have not been mentioned in the mobile computing device 100.

Exemplary computer executable instructions that can be included in the memory 102 will now be described. The memory 102 includes a location-based application 124 that is operative to provide a location-based service to the user of the mobile computing device 100. Here, the location-based application 124 can be configured to respond to two different types of location-based queries: 1) requesting a notification when a contact of the user of the mobile computing device 100 is within a predefined range of a predefined location of the user of the mobile computing device 100 (where the predefined location may be the current location of the user of the mobile computing device 100); and 2) requesting a notification if a registered contact has previously been within a predefined range of a location specified by the user of the mobile computing device 100.

With more specificity, with respect to the first type of location-based query, the location-based application 124 can inform the user of the mobile computing device 100 when a registered contact of the user of the mobile computing device 100 is geographically proximate to the mobile computing device 100. With respect to the second type of location-based query, the user of the mobile computing device 100 may wish to know whether any registered contacts of the user of the mobile computing device 100 have eaten at a particular restaurant. Accordingly, a location-based query that can be answered by way of the location-based application 124 may be "have any of my registered contacts checked in and provided a status update at location X."

The location-based application 124 can be configured to upload a location constraint pertaining to a location-based query to a server in a cloud computing system, and may further be configured to upload location data to the server that is indicative of a current location of the user of the mobile computing device 100 captured by way of the sensor 110.

A quantizer component 126 quantizes locations specified by the user of the mobile computing device 100 and/or output by the sensor 110 at predefined quantization intervals. For instance, a quantization interval may be at least fifty meters, at least one hundred meters, or some other suitable quantization interval. The quantization intervals can be selected based upon a desired accuracy corresponding to the location-based application 124. In an example, the quantizer component 126 can be configured to quantize latitude coordinates to tenths— thus, if the sensor 110 outputs a latitude coordinate of 79.34256, the quantizer component 126 can quantize such coordinate to 79.3. The quantization interval utilized by the quantizer component 126 when quantizing locations output by the sensor 110 and/or provided by the user of the mobile computing device 100 can also be known to another mobile computing device.

The memory 102 may further optionally include an encryption algorithm 128 that is configured to encrypt quantized locations output by the quantizer component 126. The encryption algorithm 128 can be shared with at least one other registered contact of the user of the mobile computing device 100, and quantized locations can be encrypted by the encryption algorithm 128 based at least in part upon a shared private key 130 that is shared between the user of the mobile computing device 100 and the at least one other registered contact of the user of the mobile computing device 100. The shared private key 130 may be shared between the user of the mobile computing device 100 and at least one other user through any suitable method including sharing via text message, e-mail, manually through a voice communication, or the like. Accordingly, when the location-based application 124 uploads a location to the server on the cloud computing system, the location-based application 124 uploads the quantized encrypted location.

The memory 102 may also optionally include a random number generator 132 that is shared between the user of the mobile computing device 100 and at least one registered contact of the user of the mobile computing device 100. According to an example, the random number generator 132 can be configured to generate a plurality of random numbers (e.g., integers) through utilization of the shared private key 130. Again, the shared private key 130 is shared with the at least one registered contact of the user of the mobile computing device 100. Accordingly, both the mobile computing device 100 and the computing device utilized by the registered contact of the user of the mobile computing device 100 will generate an identical set of random numbers, as such computing devices employ the same random number generator 132 and share the shared private key 130. Random numbers output by the random number generator 132 can be ordered (from smallest to largest) and can be mapped to predefined quantized locations. Therefore, a first random number in the sequence of random numbers will map to a first quantized location in a sequence of quantized locations.

When a location is output from the sensor 110 or otherwise received from the user of the mobile computing device 100, the quantizer component 126 can quantize such location in accordance with the predefined quantization interval. A random number in the sequence of random numbers that is mapped to the quantized location may then be selected and uploaded to the server in the cloud computing system as the location. Therefore, the server receives the random number but does not have knowledge of the mapping between the random number and the quantized location, and does not have knowledge of the shared private key 130 or the random number generator 132 that has been utilized to generate the sequence of random numbers. Accordingly, the server does not have knowledge of the location of the mobile computing device 100. Since, however, the mobile computing device utilized by the registered contact of the user of the mobile computing device 100 includes the random number generator 132 and the shared private key 130, the server can respond to location-based queries that can be responded to through location data provided by the mobile computing device 100 and the mobile computing device of the registered contact of the user of the mobile computing device 100 without having actual knowledge of the location constraint in the location-based query or the location that satisfies the location constraint.

Furthermore, the encryption algorithm 128 can be configured to encrypt an identity of the user of the mobile computing device 100 and/or the user of the registered contact of the mobile computing device 100 when location data is uploaded to the aforementioned server. Additionally, the identity of the user of the mobile computing device 100 can be anonymized through proxying, onion routing or other suitable anonymization techniques.

Figure 2:
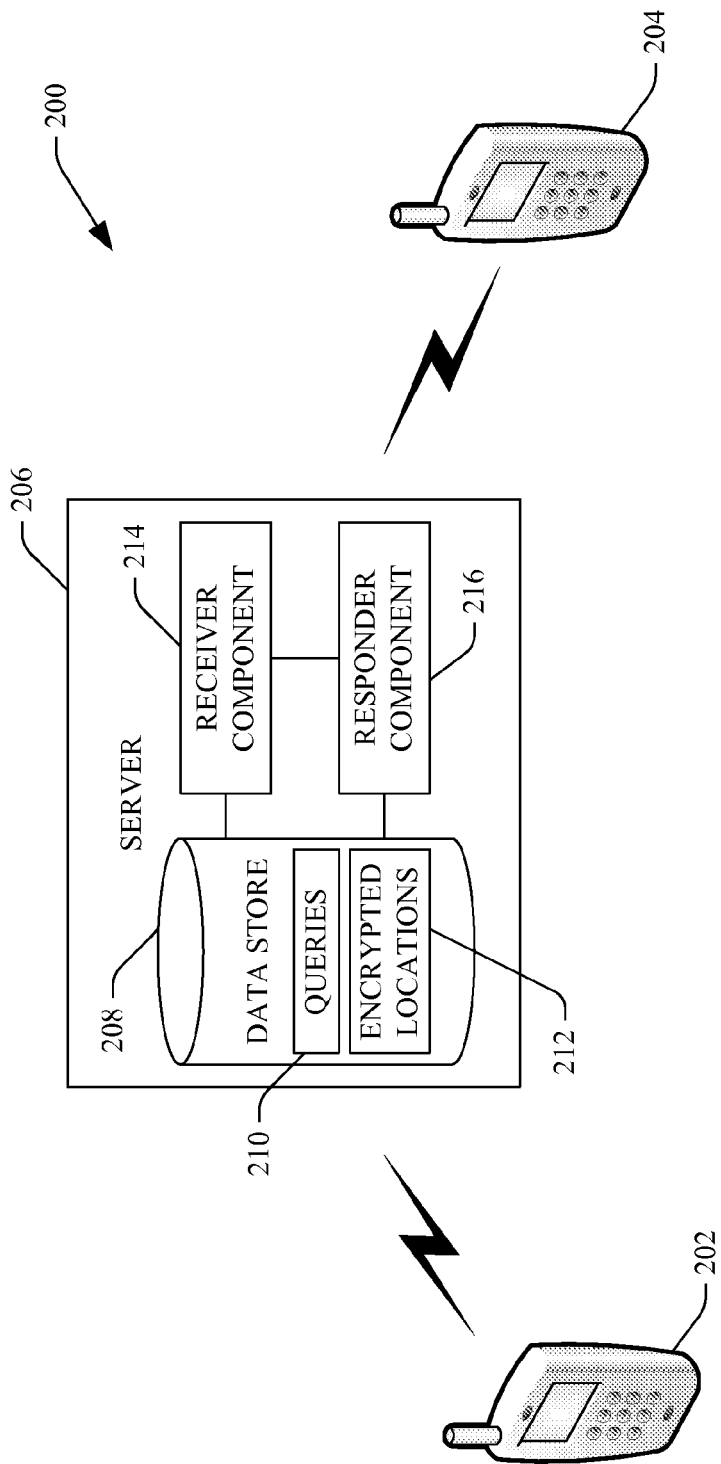
FIG. 2 is a functional block diagram of an exemplary system that facilitates responding to location-based queries without having knowledge of an actual location of one or more mobile computing devices.

With reference now to FIG. 2, an exemplary system 200 that facilitates responding to location-based queries without the responder having knowledge of locations of portable computing devices is illustrated. The system 200 comprises a first mobile computing device 202 and a second mobile computing device 204. While the first and second mobile computing devices 202 and 204 are shown as being mobile telephones, it is to be understood that the first and second mobile computing devices 202 and 204 may be any type of mobile computing device. Both the first and second mobile computing devices 202 and 204 have instances of the location-based application 124 (FIG. 1) executing thereon, the quantizer component 126 executing thereon, an encryption algorithm 128 executing thereon, and the shared private key 130. Additionally, the first and second computing devices 202 and 204 may optionally have the random number generator 132 executing thereon. As will be understood by one skilled in the art, the shared private key 130 may be a password that is shared between a first user of the first mobile computing device 202 and a second user of the second mobile computing device 204.

The system 200 further comprises a server 206 that may be included in a cloud computing system that is configured to respond to a location-based query registered therewith by the first mobile computing device 202. The server 206 may include or have access to a data store 208 that comprises a plurality of location-based queries 210, which may include a location-based query registered with the service by the first mobile computing device 202. As indicated above, the location-based query registered with the server 206 by the first mobile computing device 202 may depend upon a current location of the first mobile computing device 202 and a current location of the second mobile computing device 204, or may depend upon a location specified by the user of the first computing device 202 and current or previous locations of the second mobile computing device 204.

The data store 208 and the server 206 may also include a plurality of encrypted locations 212 uploaded to the server 206 by the first mobile computing device 202 and the second mobile computing device 204. The encrypted locations 212 can include one or more numbers generated by a random number generator that is executed on the first mobile computing device 202 and the second mobile computing device 204, wherein such random numbers are known to map to quantized locations by the first mobile computing device 202 and the second mobile computing device 204. Further, both the first mobile computing device 202 and the second mobile computing device 204 have knowledge of the quantization interval utilized to quantize sensed or input geographic locations. In more detail, as mentioned above, both the first mobile computing device 202 and the second mobile computing device 204 can include the quantizer component 126, the random number generator 132, and the shared private key 130. Utilizing the shared private key, both the first mobile computing device 202 and the second mobile computing device 204 can cause the random number generator 132 to generate a plurality of random numbers. Subsequently, the first mobile computing device 202 and the second mobile computing device 204 can order the random numbers generated by the random number generator 132 in a sequence (smallest to largest). Both the first mobile computing device 202 and the second mobile computing device 204 may then map predefined quantized locations to the sequenced random numbers generated by the random number generator component 132. Therefore, an identical predefined mapping between quantized locations and randomly generated numbers exists at the first mobile computing device 202 and at the second mobile computing device 204. For a multidimensional coordinate system, mappings between quantized locations and random numbers generated by the random number generator component 132 can be generated for each axis in the coordinate system.

Pursuant to an example, the first user of the first mobile computing device 202 may register a location-based query with the server 206. This location-based query includes a location constraint, which comprises at least one encrypted location. For instance, the location-based query may request that the first user of the first mobile computing device 202 be provided with a notification when the second mobile computing device 204 is within a certain range of a current location of the first mobile computing device 202. Accordingly, to generate the location-based query, a sensor on the first mobile computing device 202 can output a current location of the first mobile computing device 202. This location may be quantized by the quantizer component 126 using the known, predefined quantization interval. To define the range around the current location of the mobile computing device 202, the first mobile computing device 202 can identify K number of adjacent quantized locations to the current quantized location of the first mobile computing device 202. The identified quantized locations are then mapped to the corresponding random numbers generated by the random number generator component 132 and uploaded to the server 206 as the location constraint for the location-based query.

The server 206 comprises a receiver component 214 that receives the location-based query from the first mobile computing device 202 and can cause the location-based query to be retained amongst the queries 210 in the data store 208. Additionally, the first mobile computing device 202 can identify the user of the second mobile computing device 204 in the location-based query such that the server 206 can identify the user of the second mobile computing device 204 when locations of the second mobile computing device 204 are uploaded to the server 206. Pursuant to an example, the user of the first mobile computing device 202 can encrypt the identity of the user of the second mobile computing device 204 utilizing the encryption algorithm 128 and the shared private key 130 that is resident upon both the first mobile computing device 202 and the second mobile computing device 204. Therefore, the location-based query uploaded by the first mobile computing device 202 to the server 206 can include an encrypted identity of the user of the second mobile computing device 204, as well as encrypted locations as part of the location constraint.

As the second mobile computing device 204 moves about geographically, the second mobile computing device 204 can upload encrypted locations of the second mobile computing device 204 to the server 206. That is, a sensor on the second mobile computing device 204 can output a current location of the second mobile computing device 204, and the quantizer component 126 can quantize the current location in accordance with the known, shared quantization interval. A number in the sequence of numbers generated by the random number generator 132 that maps to the quantized location is then identified. The second mobile computing device 204 may than encrypt the identity of the user of the second mobile computing device 204 through utilization of the shared encryption algorithm 128 and the shared private key 130. The second mobile computing device 204 may than upload a data packet that comprises the encrypted location (the random number), as well as the encrypted identity of the user of the second mobile computing device 204. The receiver component 214 can receive this data packet and cause the encrypted location to be retained in the encrypted locations 212 of the data store 208.

The server 206 additionally comprises a responder component 216 that compares the location-based query uploaded by the first mobile computing device 202 with locations uploaded by the second mobile computing device 204 and transmits a response to the location-based query to the first mobile computing device 202 based at least in part upon the comparison between the location constraint of the location-based query and the encrypted location uploaded to the server 206 by the second mobile computing device 204. In an example, the responder component 216 can determine that the location constraint of the location-based query is satisfied by the encrypted location uploaded by the user of the second mobile computing device 204 by first ascertaining that the encrypted identity of the second user of the second mobile computing device 204 in the location-based query matches the encrypted identity of the second user of the second mobile computing device 204 that is included in the data packet uploaded to the server 206 by the second mobile computing device 204. Thereafter, the responder component 216 can compare the encrypted location constraint with the encrypted location included in the data packet uploaded by the second mobile computing device 204 to the server 206. If the encrypted locations match, the responder component 216 can cause a signal to be transmitted to the first mobile computing device 202 that indicates that the second user of the second mobile computing device 204 is within the geographic range of the first mobile computing device 202 defined by the first user of the first mobile computing device 202.

From this example, it can be ascertained that the server 206 is not provided with the true identity of the second user of the second mobile computing device 204 or the true location of the second user of the second mobile computing device 204 (or the true location in the location constraint specified by the first user of the first mobile computing device 202). Over time, however, the mapping between the random numbers generated by the random number generator 132 and the quantized locations may be learned through brute force (through physical monitoring of locations of the users of the first and second mobile computing devices 202 and 204, respectively). Accordingly, it may be desirable to regenerate such mapping from time to time. This mapping can be regenerated when the users of the first and second mobile computing devices 202 and 204 generate a new shared private key.

To support historic queries such as "has XXX ever been at location YYY", the first and second mobile computing devices 202 and 204, respectively, may need to retain historic quantized locations thereon and remap these historic quantized locations to numbers in a new sequence of random numbers created by the random number generator 132. The newly encrypted locations are then uploaded by both the first and second mobile computing devices 202 and 204 to the server 206 with instructions to delete previous encrypted locations from the first mobile computing device 202 and the second mobile computing device 204.

In another exemplary embodiment, rather than utilizing the random number generator 132, the shared encryption algorithm 128 can be employed by both the first mobile computing device 202 and the second mobile computing device 204 to encrypt both identities and locations of the users of the first mobile computing device 202 and the second mobile computing device 204. Again, both the first mobile computing device 202 and the second mobile computing device 204 can utilize the shared private key 130 in connection with encrypting quantized locations. For instance, the first mobile computing device 202 may wish to register a location-based query with the server 206, wherein the location-based query includes a location constraint that comprises at least one encrypted location. The location constraint specified by the first user of the first mobile computing device 202 can be quantized, and the quantized location can be encrypted by the encryption algorithm 128 using the shared private key 130.

Additionally and optionally, as the location-based query pertains to the second user of the second mobile computing device 204, the encryption algorithm 128 and the shared private key 130 can be employed to encrypt the identity of the second user of the second mobile computing device 204 in the location-based query. As the second user of the second mobile computing device 204 moves about a geographic region, the sensor on the second mobile computing device 204 can output geographic locations of the second mobile computing device 204. The quantizer component 126 can quantize the geographic locations in accordance with the known, shared quantization interval, and the shared encryption algorithm 128 together with the shared private key 130 can be employed to encrypt the quantized location.

The second mobile computing device 204 may then upload the encrypted, quantized location to the server 206, where it is received by the receiver component 214. Furthermore, the uploaded location may have an encrypted identity of the second user of the second mobile computing device 204 attached thereto. The responder component 216 can compare the encrypted identity in the location-based query with the encrypted identity uploaded from the second mobile computing device 204 to ascertain that the location-based query pertains to the second user of the second mobile computing device 204. The responder component 216 can then compare the encrypted location constraint in the location-based query with one or more encrypted locations uploaded to the server 206 by the second mobile computing device 204. If one or more uploaded encrypted, quantized locations from the second mobile computing device 204 satisfies the encrypted, quantized location constraint provided by the first mobile computing device 202, the responder component 216 can cause a response to the location-based query to be transmitted to the first mobile computing device 202.

Through this approach, the server 206 has no knowledge of the actual location in the location constraint set forth by the first user of the first mobile computing device 202, or the actual locations of the second mobile computing device 204 as the second mobile computing device 204 uploads quantized encrypted locations to the server 206. If the location constraint desirably includes a certain range (e.g., within 500 yards of a current location), this range constraint can be satisfied by selecting quantized locations that correspond to such range, encrypting the quantized locations, and uploading each of the quantized locations to the server 206 as the location constraint. The responder component 216 can then compare the encrypted, quantized locations in the location constraint with one or more encrypted, quantized locations provided by the second mobile computing device 204.

Again, over time, it may be possible through brute force to learn mappings between quantized locations and their encrypted values. Accordingly, from time to time, it may be desirable to change the shared private key 130 such that the encryption scheme alters. This may require some computation on the first mobile computing device 202 and the second mobile computing device 204 to support historic location-based queries, and additionally may require relatively large amounts of data to be uploaded from the first and second mobile computing devices 202 and 204 to the server 206 to support historic location-based queries.

As can be ascertained from the above, utilization of a shared quantization interval and a shared encryption scheme between the first and second mobile computing devices 202 and 204 can allow for location-based queries registered by either the first or second mobile computing device 202 or 204 to be responded to by a cloud computing service without the cloud computing service having knowledge of locations of either the first mobile computing device 202 or the second mobile computing device 204.

Figure 3:
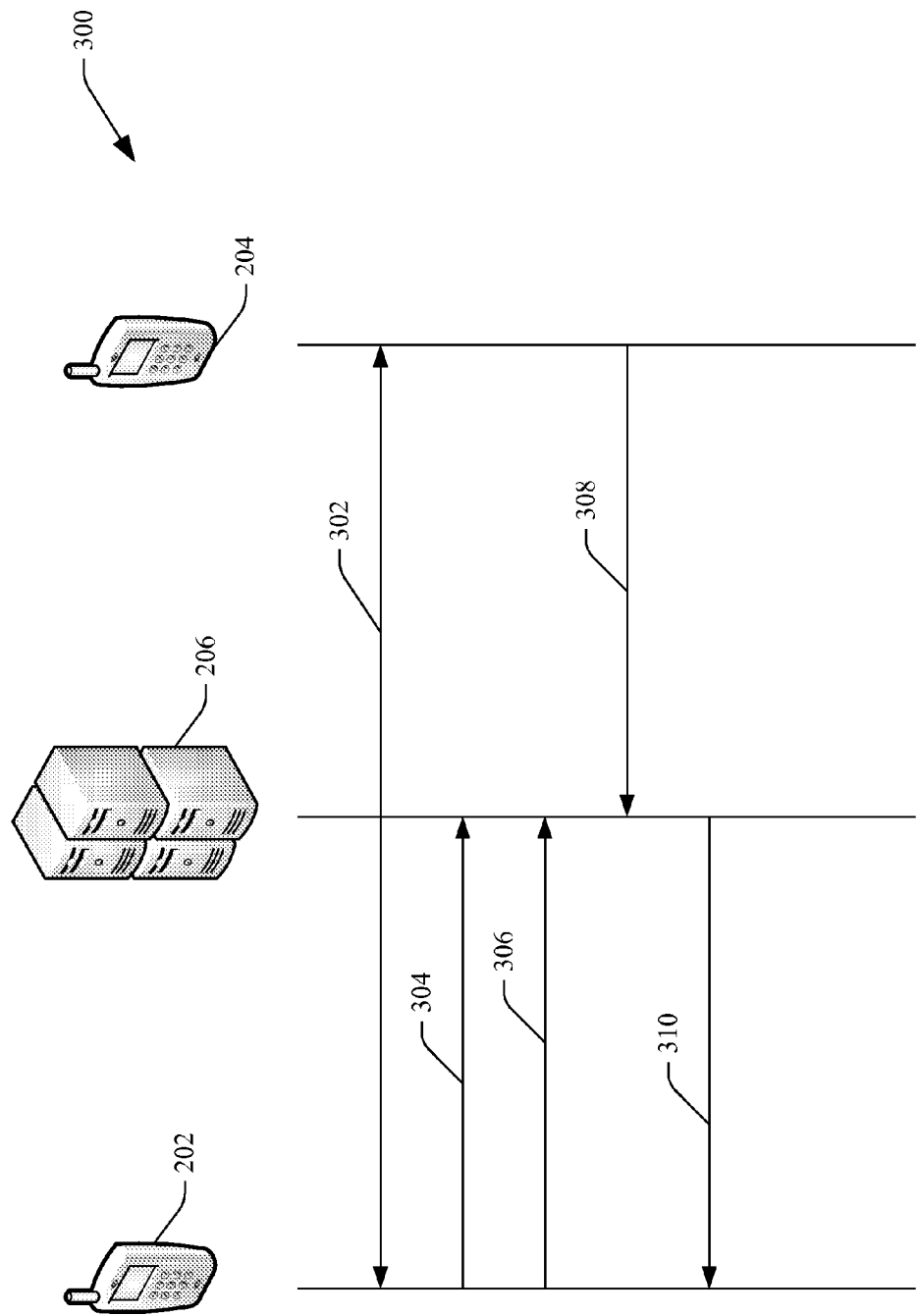
FIG. 3 is a control flow diagram that illustrates communications undertaken between a first mobile computing device, a second mobile computing device, and a server in connection with responding to location-based queries.

With reference now to FIG. 3, an exemplary control flow diagram 300 that illustrates communications undertaken between the first mobile computing device 202, the second mobile computing device 204, and the server 206 in connection with responding to location-based queries is illustrated. At 302, the first mobile computing device 202 and the second mobile computing device 204 share a secure random number generator and a private key utilized when generating random numbers. Additionally, at 302, the first and second mobile computing devices 202 and 204 share a quantization interval for quantizing locations. As described above, utilizing the shared secure random number generator, the private key, and the known quantization intervals of the first mobile computing device 202 and the second mobile computing device 204 can generate a mapping between quantized locations and random numbers generated by the random number generator.

At 304, the first mobile computing device 202 provides a location-based query to the server 206, wherein the location-based query 304 can include an encrypted identity of the user of the second mobile computing device 204 and a location constraint that includes at least one encrypted location (a random number that maps to a selected or observed quantized location).

If the location constraint in the location-based query pertains to the current location of the user of the first mobile computing device 202, then at 306 quantized encrypted locations of the first mobile computing device 202 can be uploaded to the server 206. This new quantized encrypted location can be utilized as the location constraint of the location-based query.

At 308, quantized encrypted locations of the second mobile computing device 204 are uploaded to the server 206. As described above, a sensor on the second mobile computing device 204 can output data that is indicative of the current location of the second mobile computing device 204, and such location can be quantized in accordance with the predefined quantization interval. Thereafter, the number generated by the random number generator that corresponds to the quantized location can be selected and uploaded to the server 206 as the encrypted, quantized location. The server 206 can then compare the encrypted, quantized location with the location constraint of the location-based query provided by the first mobile computing device 202. If the encrypted, quantized location uploaded at 308 matches an encrypted, quantized location in the location constraint of the location-based query, at 310, the server 206 can transmit a response to the first mobile computing device 202 that indicates that the location-based constraint has been satisfied. In other words, the server 206 can transmit response data to the location-based query set forth by the first mobile computing device 202.

Figure 4:
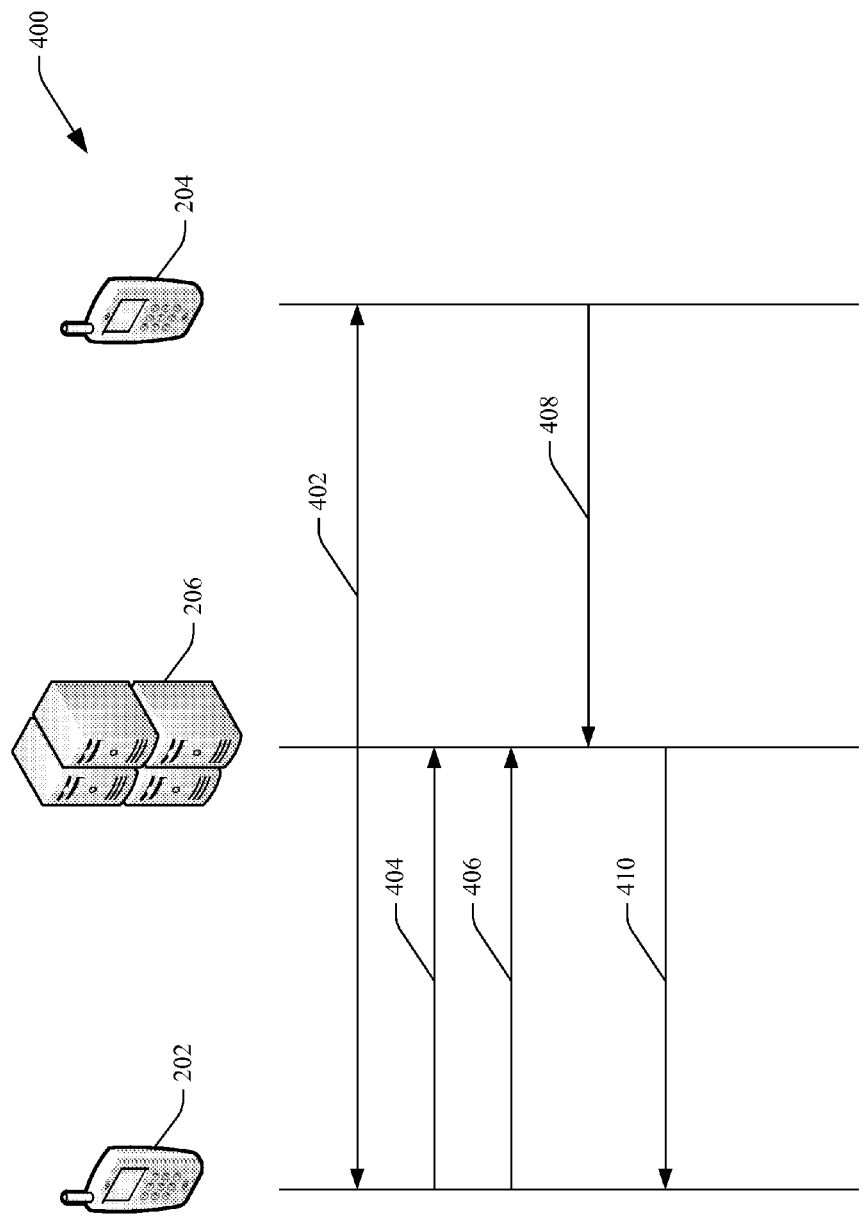
FIG. 4 is an exemplary control flow diagram that illustrates communications undertaken between a first mobile computing device, a second mobile computing device, and a server in connection with responding to location-based queries.

Turning now to FIG. 4, another exemplary control flow diagram 400 that illustrates communications undertaken between the first mobile computing device 202, the second mobile computing device 204, and the server 206 in connection with responding to location-based queries is illustrated. At 402, the first mobile computing device 202 and the second mobile computing device 204 share an encryption algorithm and a private key that can be utilized by the encryption algorithm to encrypt data. Additionally, at 402, a quantization interval can be shared between the first mobile computing device 202 and the second mobile computing device 204. While the act 402 illustrates such communications being undertaken between the first mobile computing device 202 and the second mobile computing device 204, it can be understood that the encryption algorithm, the quantization interval, and the shared private key can be shared between users of the first mobile computing device 202 and the second mobile computing device 204 without causing the mobile computing devices 202-204 to interact directly.

At 404, the first mobile computing device 202 provides the server 206 with a location-based query that can include an encrypted identity of the second user of the second mobile computing device 204 as well as a location constraint that includes an encrypted, quantized location. More particularly, the first user of the first mobile computing device 202 can indicate a location that is to be included in the location constraint of the location-based query, and the first mobile computing device 202 can quantize such location in accordance with the predefined, shared quantization interval. Using the shared encryption algorithm and shared private key, the first mobile computing device 202 can encrypt the location and at 404 can upload the location-based query that includes the encrypted, quantized location to the server 206.

At 406, if the location constraint in the location-based query is the dynamic location of the first mobile computing device 202, the first mobile computing device 202 can cause encrypted, quantized locations that are indicative of the current location of the first mobile computing device 202 to the server 206. Therefore, a sensor on the first mobile computing device 202 can output data that is indicative of a current geographic location of the first mobile computing device 202 and the quantizer component 126 can quantize the location in accordance with the predefined, shared quantization interval.

Thereafter, the encryption algorithm 128 can encrypt the quantized location utilizing the shared private key, and this encrypted, quantized location can be uploaded to the server 206 as at least a part of the location constraint.

At 408, data packets generated by the second mobile computing device 204 are uploaded to the server 206. The data packets include an encrypted identity of the second user of the second mobile computing device 204 (encrypted by the shared encryption algorithm 128 utilizing the shared private key 132) and encrypted quantized location. That is, a sensor on the second mobile computing device 204 can output data that is indicative of the current location of the second mobile computing device 204, and the quantizer component 126 can quantize the location data in accordance with the predefined, shared quantization interval. The shared encryption algorithm 128 may then be employed to encrypt the quantized location utilizing the shared private key 132.

The server 206 can compare the location constraint of the location-based query with one or more encrypted, quantized locations uploaded by the second mobile computing device 204 to the server 206, and if an encrypted, quantized location uploaded by the second mobile computing device 204 matches the encrypted, quantized location in the location constraint, the server 206 can transmit a response to the location-based query to the first mobile computing device 202 at 410. Additionally since the identity of the second user of the second mobile computing device 204 is encrypted in connection with the location-based query by the first mobile computing device 202 and is additionally encrypted when uploaded to the server 206 by the second mobile computing device 204, the server 206 can respond to location-based query without having knowledge of the identity of the second user of the second mobile computing device 204, the location of the second mobile computing device 204, or the location specified in the location constraint. Therefore, the server 206 can answer location-based queries without decrypting encrypted location information or encrypted identities.

With reference now to FIGS. 5-8, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Figure 5:
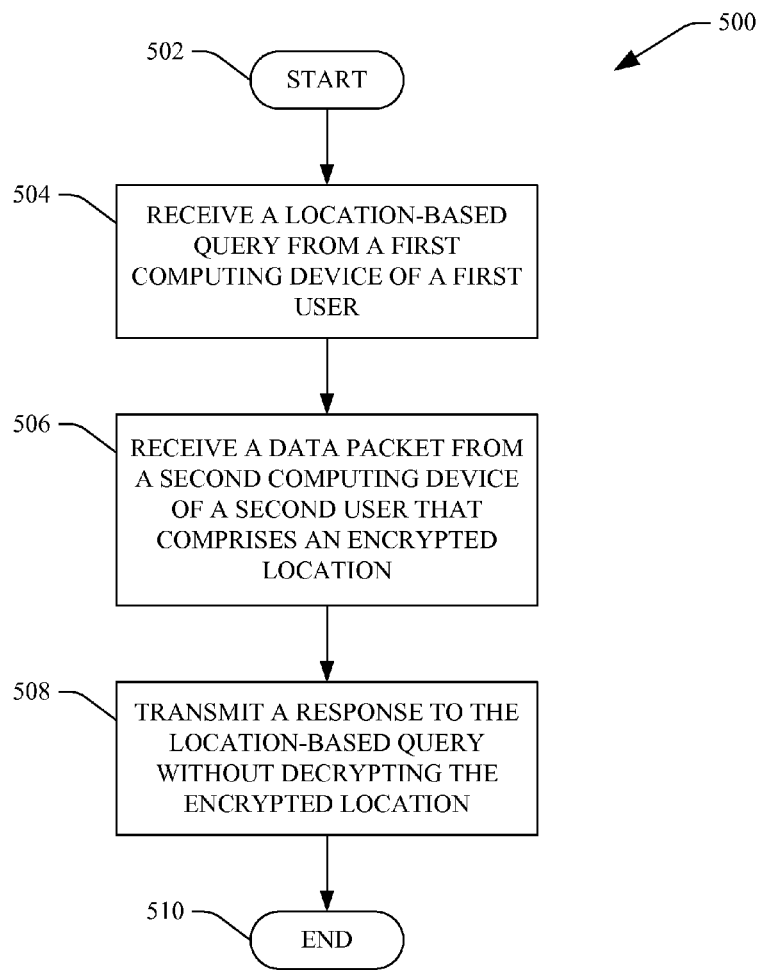
FIG. 5 is a flow diagram that illustrates an exemplary methodology for transmitting a response to a location-based query without decrypting encrypted locations of mobile computing devices.

Now referring to FIG. 5, an exemplary methodology 500 that facilitates transmitting a response to a location-based query without having knowledge of actual locations of mobile computing devices is illustrated. The methodology 500 starts at 502, and at 504 a location-based query is received at a server from a first computing device of a first user. The location-based query, more specifically, is received from a location-based application that is executing on the first computing device of the first user, and includes an encrypted location constraint, as well as an encrypted identity of a second user of a second computing device.

At 506, a data packet is received at the server from a second computing device of a second user. The data packet can include an encrypted identity of the second user as well as an encrypted (quantized) location. Pursuant to an example, an identical encryption scheme can be utilized to encrypt the location in the data packet from the second computing device that was utilized in to encrypt the location constraint received from the first computing device. In other words, the encryption scheme can be shared between the first computing device and the second computing device.

At 508, a processor on the server is caused to transmit a response to the location-based query to the first user of the first computing device without decrypting the location constraint and the encrypted location of the second user. Additionally, the response can be transmitted to the first user of the first computing device without decrypting the encrypted identity of the second user. The methodology 500 completes at 510.

Figure 6:
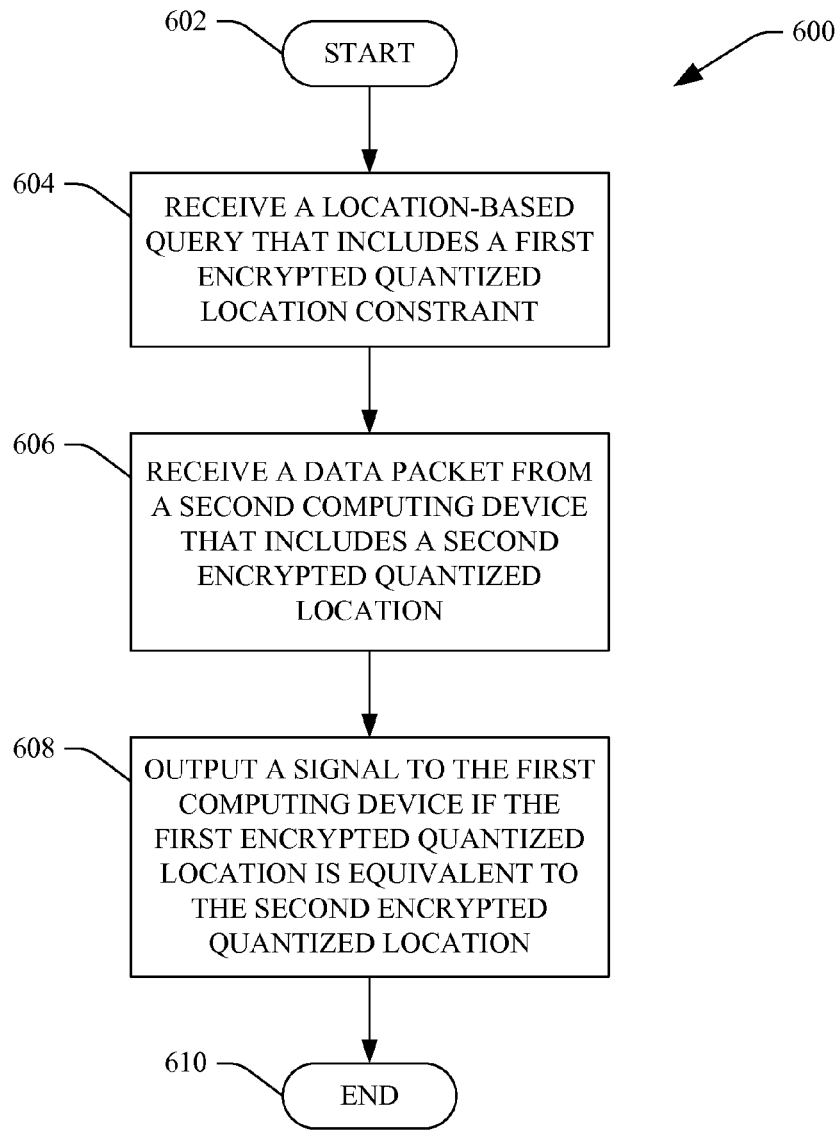
FIG. 6 is a flow diagram that illustrates an exemplary methodology for comparing encrypted location values in connection with answering location-based queries.

Now referring to FIG. 6, an exemplary methodology 600 that facilitates responding to a location-based query at a server without knowing the actual locations of mobile computing devices germane to the location-based query is illustrated. The methodology 600 starts at 602, and at 604, a location-based query is received from a first computing device of a first user. The location-based query includes an encrypted identity of a second user and a location constraint that comprises a first encrypted, quantized geographic location.

At 606, a data packet is received from a second computing device of the second user, wherein the data packet includes the encrypted identity of the second user and a second encrypted geographic location that is representative of a second quantized location of the second user.

At 608, a signal is output to the first computing device that indicates that the location constraint of the location-based query has been satisfied based at least in part upon a comparison between the first encrypted geographic location and the second encrypted geographic location. For instance, the signal can be output if the first encrypted geographic location is equal to the second encrypted geographic location. Further, the signal is output without decrypting the encrypted identity of the second user, the first encrypted geographic location, or the second encrypted geographic location.

Figure 7:
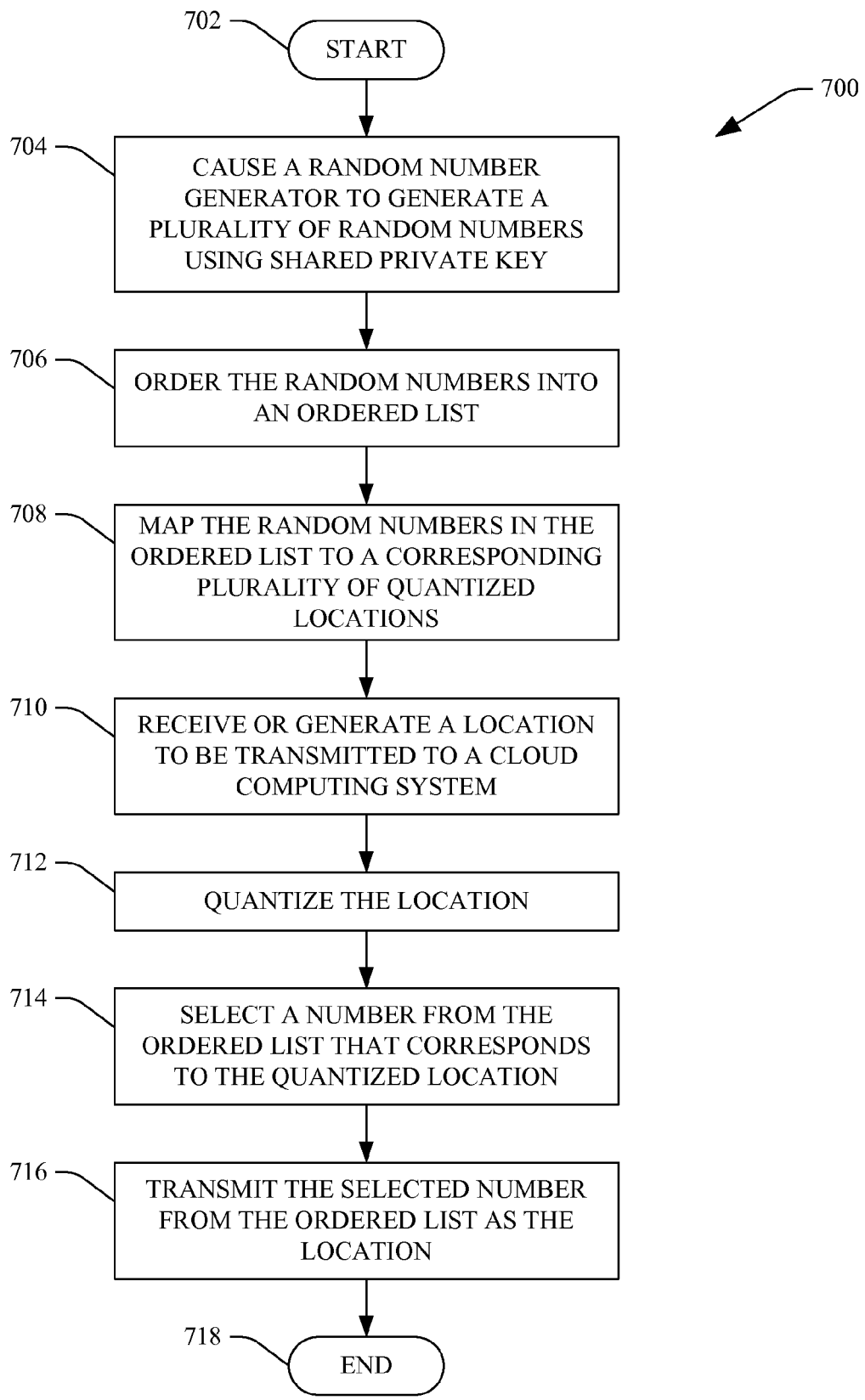
FIG. 7 is a flow diagram that illustrates an exemplary methodology for quantizing and encrypting locations, and thereafter providing the quantized, encrypted locations to a server that is configured to respond to location-based queries.

Now referring to FIG. 7, an exemplary methodology for transmitting encrypted location information to a server is illustrated. For instance, a mobile computing device can be configured to execute the methodology 700. The methodology 700 starts at 702, and at 704, a random number generator is caused to generate a plurality of random numbers using a private key that is shared with at least one other mobile computing device. At 706, the random numbers generated by the random number generator are ordered into an ordered list.

At 708, the random numbers in the ordered list of random numbers are mapped to a corresponding plurality of quantized locations. Therefore, each quantized location in the plurality of quantized locations will have a random number mapped thereto. The at least one other mobile computing device can utilize the same random number generator and the shared private key to generate an identical mapping between predefined quantized locations and the random numbers.

At 710, a location that is desirably transmitted to a cloud computing system is received or generated. For instance, a user can type in a particular location or a sensor can output a location. At 712, the received or generated location is quantized in accordance with the predefined quantization interval.

At 714, a number from the ordered list that corresponds to the quantized location is selected. The selected number from the ordered list is representative of the quantized locations and transmitted to a server that is configured to answer location-based queries based at least in part upon the selected number from the ordered list of random numbers. The methodology 700 completes at 718.

Figure 8:
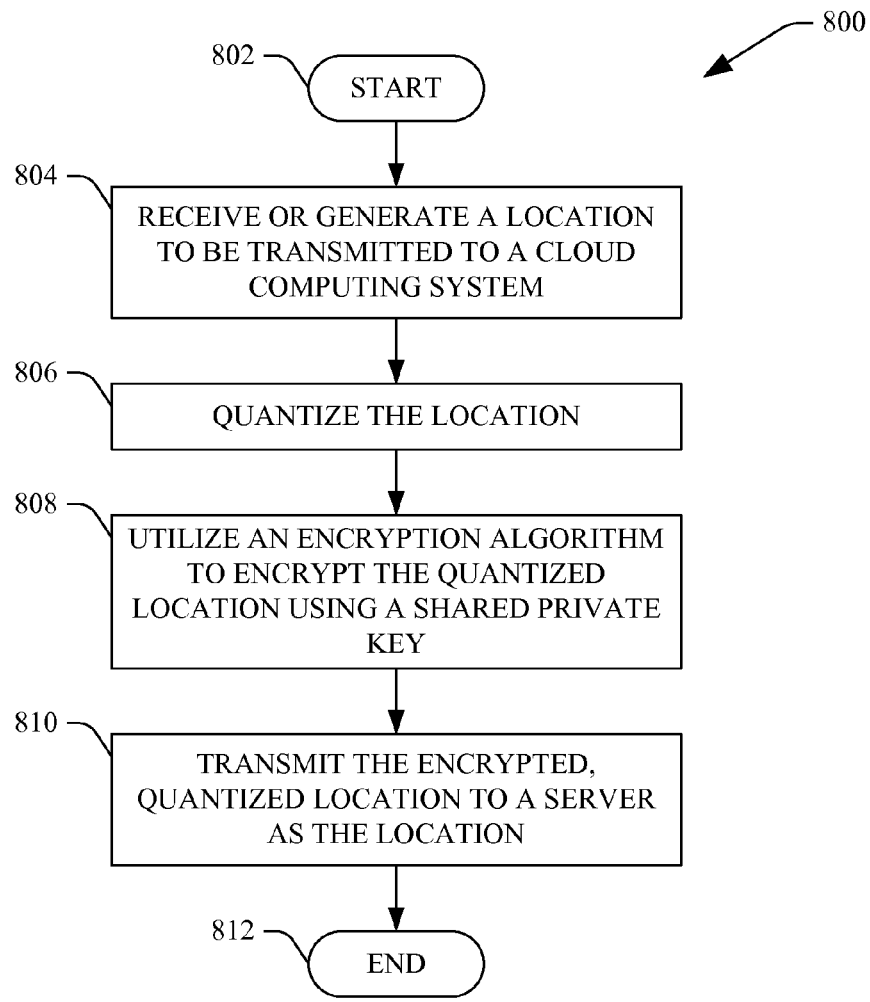
FIG. 8 is a flow diagram that illustrates an exemplary methodology for transmitting and encrypted, quantized location to a server that is configured to answer location-based queries.

Now referring to FIG. 8, another exemplary methodology 800 that facilitates transmitting encrypted location data to a server that can then answer location-based queries based at least in part upon the encrypted location is illustrated. For instance, a mobile computing device can be configured to execute the methodology 800. The methodology starts 802, and at 804 a location that is desirably transmitted to a cloud computing system for utilization in connection with answering a location-based query is received or generated. For instance, the location can be received from a user that may specify a particular location of interest or the location can be generated by way of a sensor on a mobile computing device.

At 806, the location received or generated at 804 is quantized in accordance with a predefined quantization interval. At 808, the encryption algorithm that is shared with another mobile computing device is utilized to encrypt the quantized location by employing a private key that is also shared with the other mobile computing device. At 810, the encrypted, quantized location is transmitted to a server as representative of the received or generated location at 804, and the server can answer a location-based query based at least in part upon the encrypted quantized location. The methodology 800 completes at 812.

Figure 9:
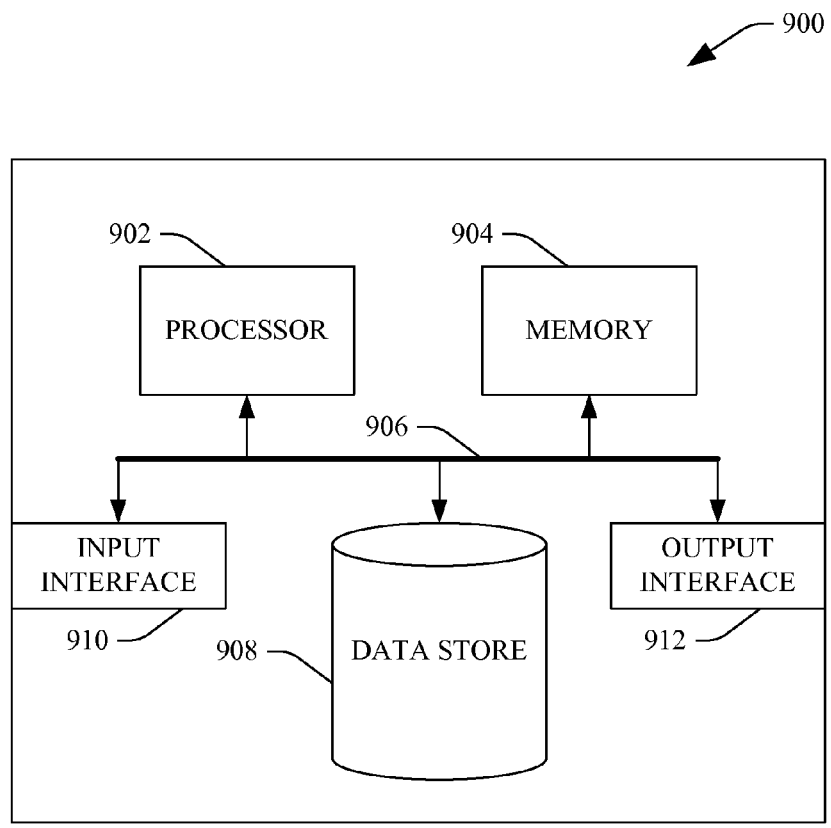
FIG. 9 is an exemplary computing system.

Now referring to FIG. 9, a high-level illustration of an exemplary computing device 900 that can be used in accordance with the systems and methodologies disclosed herein is illustrated. For instance, the computing device 900 may be used in a system that supports answering location-based queries. The computing device 900 includes at least one processor 902 that executes instructions that are stored in a memory 904. The memory 904 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store registered location-based queries, historic locations of mobile computing devices, etc.

The computing device 900 additionally includes a data store 908 that is accessible by the processor 902 by way of the system bus 906. The data store may be or include any suitable computer-readable storage, including a hard disk, memory, etc. The data store 908 may include executable instructions, registered location-based queries, encrypted, quantized locations, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method executed at a server device, the method comprising:
   receiving a location-based query from a location-based application executing on a first computing device of a first user, the location-based query comprising an encrypted location constraint and an encrypted identity of a second user of a second computing device;
   receiving a data packet from a second computing device that comprises the encrypted identity of the second user and an encrypted location of the second computing device;
   responsive to receiving the data packet from the second computing device, comparing the encrypted location constraint with the encrypted location of the second computing device;
   determining a response to the location-based query based upon the comparing of the encrypted location constraint with the encrypted location of the second computing device, the response determined without decrypting the location constraint and the encrypted location of the second computing device; and
   causing a processor on the server to transmit the response to the location-based query to the first computing device.

2. The method of claim 1, wherein the response is determined without decrypting the identity of the second user.

3. The method of claim 1, wherein the processor on the server transmits the response when the second computing device is within a predefined geographic distance of a current location of the first computing device.

4. The method of claim 1, wherein the processor on the server transmits the response when the second computing device is within a predefined geographic distance from a location identified by the first user.

5. The method of claim 1, wherein the processor on the server transmits the response if the second user has previously been within a predefined geographic distance from a location identified by the first user.

6. The method of claim 1, wherein the encrypted location constraint comprises at least one integer generated by a random number generator that represents a first quantized location, and wherein the encrypted location of the second user comprises at least one integer generated by the random number generator that represents a second quantized location, wherein the comparing of the encrypted location constraint with the encrypted location of the second computing device comprises comparing the at least one integer of the encrypted location constraint with the at least one integer of the encrypted location.

7. The method of claim 6, wherein a quantization interval utilized when producing the quantized locations is predefined.

8. The method of claim 1, wherein the encrypted location constraint comprises a first encrypted value that represents a quantized location, the first encrypted value generated at the first computing device utilizing a first encryption algorithm and a first private key, and wherein the encrypted location of the second computing device comprises a second encrypted value that represents a quantized location of the second computing device, the second encrypted value generated at the second computing device utilizing the first encryption algorithm and the first private key, and wherein the comparing of the encrypted location constraint with the encrypted location of the second computing device comprises comparing the first encrypted value with the second encrypted value.

9. The method of claim 8, wherein the first encrypted value is representative of a first quantized latitude value, wherein the location constraint further comprises a third encrypted value that is representative of a first quantized longitude value, wherein the second encrypted value is representative of a second quantized latitude value, and wherein encrypted location of the second computing device comprises a fourth encrypted value that is representative of a second longitude value, wherein the comparing of the encrypted location constraint with the encrypted location of the second computing device comprises:
 comparing the first encrypted value with the second encrypted value; and
 comparing the third encrypted value with the fourth encrypted value.

10. The method of claim 1, wherein the encrypted location constraint is generated by way of an encryption algorithm executed at the first computing device using a shared private key, and wherein the encrypted location of the second computing device is generated by way of the encryption algorithm executed at the second computing device using the shared private key.

11. The method of claim 1, wherein the encrypted location constraint is generated by way of a secure random number generator executed at the first computing device using a shared private key, and wherein the encrypted location of the second computing device is generated by way of the secure random number generator executed at the second computing device using the shared private key.

12. A system comprising a plurality of components, the components comprising:
 a receiver component that receives:
  a location-based query from a first computing device of a first user, the location-based query comprising an encrypted identity of a second user and a location constraint that comprises a first encrypted geographic location; and
  a data packet from a second computing device of the second user that includes the encrypted identity of the second user and a second encrypted geographic location, the second encrypted geographic location representing one of a current geographic location of the second user or a historic geographic location of the second user; and
 a responder component that performs a comparison between the first encrypted geographic location and the second encrypted geographic location and transmits a response to the location-based query to the first computing device based at least in part upon the comparison without decrypting the first encrypted geographic location or the second encrypted geographic location.

13. The system of claim 12, wherein the first encrypted geographic location is representative of a quantized most recent geographic location of the first user received by the receiver component, and wherein the response transmitted by the responder component indicates whether the second user is within a predefined geographic range of the first user.

14. The system of claim 12, wherein the first encrypted geographic location is representative of a quantized geographic location of interest to the first user, and wherein the response transmitted by the responder component indicates whether the second user has previously been within a predefined geographic range of the quantized geographic location of interest to the first user.

15. The system of claim 12, wherein the responder component transmits the response to the location-based query to the first computing device without decrypting the encrypted identity of the second user.

16. The system of claim 12 comprised by a server in a cloud computing system.

17. The system of claim 12, wherein the first encrypted location is generated by a secure random number generator on the first computing device utilizing a private key shared with the second user, and the second encrypted location is generated by the secure random number generator on the second computing device utilizing the private key.

18. The system of claim 12, wherein the first encrypted location is generated by an encryption algorithm on the first computing device utilizing a private key shared with the second user, and the second encrypted location is generated by the encryption algorithm on the second computing device utilizing the private key.

19. The system of claim 12, wherein the encrypted first location and the encrypted second location are representations of quantized locations of the first and second user, respectively.

20. Computer-readable data storage comprising instructions that, when executed by a processor, cause the processor to perform acts, comprising:
 receiving a location-based query from a first computing device of a first user, the location-based query comprising an encrypted identity of a second user and a location constraint that comprises a first encrypted geographic location that is representative of a first quantized location;
 receiving a data packet from a second computing device of the second user, the data packet comprising the encrypted identity of the second user and a second encrypted geographic location that is representative of a second quantized current location of the second user;
 responsive to receiving the data packet from the second computing device, comparing the first encrypted geographic location with the second encrypted geographic location without decrypting the encrypted identity of the second user, the first encrypted geographic location, or the second decrypted geographic location; and
 outputting a signal to the first computing device that indicates that the location-constraint of the location-based query has been satisfied when the first encrypted geographic location is equal to the second encrypted geographic location.

* * * * *